USO05552215A

United States Patent [19]

Tredway et al.

[11] Patent Number: 5,552,215
[45] Date of Patent: Sep. 3, 1996

[54] FIBER REINFORCED GLASS MATRIX COMPOSITES WITH SECONDARY MATRIX REINFORCEMENT

[75] Inventors: William K. Tredway, Manchester; Craig W. Musson, Wethersfield, both of Conn.; Otis Y. Chen, Tokyo, Japan

[73] Assignee: United Technologies Corporation, Hartford, Conn.

[21] Appl. No.: 774,756

[22] Filed: Oct. 9, 1991

[51] Int. Cl.$^6$ .............................. B32B 17/02; B32B 33/00
[52] U.S. Cl. .......................... 428/298; 524/494; 65/442;
428/113; 428/212; 428/297; 428/323; 428/408;
428/426; 428/427; 428/698; 428/699; 428/701;
428/704
[58] Field of Search ............................... 524/494; 65/4.1;
428/113, 212, 297, 298, 323, 408, 426,
427, 698, 699, 701, 704

[56] References Cited

U.S. PATENT DOCUMENTS

| | | | |
|---|---|---|---|
| 3,828,699 | 8/1974 | Bowen et al. | 109/80 |
| 4,263,367 | 4/1981 | Prewo | 428/338 |
| 4,314,852 | 2/1982 | Brennan et al. | 501/88 |
| 4,324,843 | 4/1982 | Brennan et al. | 428/697 |
| 4,428,763 | 1/1984 | Layden | 65/4.21 |
| 4,457,967 | 7/1984 | Chareire et al. | 428/212 |
| 4,464,192 | 8/1984 | Layden | 65/18.1 |
| 4,511,663 | 4/1985 | Taylor | 501/4 |
| 4,626,515 | 12/1986 | Chyung et al. | 501/32 |
| 4,766,096 | 8/1988 | Layden et al. | 501/17 |

(List continued on next page.)

FOREIGN PATENT DOCUMENTS

| | | | |
|---|---|---|---|
| 0351113 | 1/1990 | European Pat. Off. | 35/80 |
| 62-28411 | 2/1987 | Japan . | |
| 62-28412 | 2/1987 | Japan . | |

OTHER PUBLICATIONS

American Ceramic Society Bulletin, vol. 67, No. 11, Nov. 1988, Columbus, Ohio, U.S.A.—Laurel M. Sheppard—"Toughening Glass With Fiber Reinforcements", see p. 1781, Column 2, p. 1782.
Chemical Abstracts, vol. 113, No. 14, 1 Oct. 1990, Columbus, Ohio, U.S.A., Abstract No. 119798h, p. 287.
*The Oxidative Stability of Carbon Fibre Reinforced Glass--Matrix Composites*, by K. M. Prewo et al., published in Journal Of Materials Science, vol. 23, No. 2 at pp. 523–527, Feb. 1988.
*Fiber–Matrix Interfacial Effects in Carbon–Fiber–Reinforced Glass Matrix Composites*, by W. K. Tredway et al., published in Carbon, vol. 27, No. 5 at pp. 717–727, 1989.
"Composite materials made from a porous 2D–carbon–carbon preform densified with boron nitride by chemical vapour infiltration," by Hannache et al., J. Mater. Sci.. vol. 19, No. 1 pp. 202–212 (1984).
Chem. abs. 107: 204007v.
"Crack Deflection Processes—I. Theory," by Faber et al., Acta metall vol. 31, No. 4 pp. 565–576 (1983).

Primary Examiner—Paul R. Michl
Assistant Examiner—John J. Guarriello
Attorney, Agent, or Firm—George J. Romanik

[57] ABSTRACT

A fiber reinforced glass matrix composite has a glass matrix or glass ceramic and a plurality of primary and secondary reinforcing fibers dispersed in the matrix. The primary fibers may be continuous or discontinuous. The secondary fibers are discontinuous. The secondary reinforcing fibers which are shorter than the primary fibers fill regions of the matrix not filled with the primary reinforcing fibers. The composite may be made by uniformly distributing the secondary reinforcing fibers in a dispersant. A glass powder is mixed in a carrier liquid to create a slurry and the secondary reinforcing fibers and dispersant are slowly added to the slurry so the fibers uniformly disperse as they are added. A binder is also added to the slurry. A continuous fiber is impregnated with the slurry and the impregnated fiber is dried to remove the carrier liquid. The impregnated yarn is cut to a suitable length and molded by a suitable molding method to form a fiber reinforced glass matrix composite.

7 Claims, 1 Drawing Sheet

U.S. PATENT DOCUMENTS

| | | | |
|---|---|---|---|
| 4,778,722 | 10/1988 | Yamamura et al. | 428/367 |
| 4,780,432 | 10/1988 | Minford et al. | 501/32 |
| 4,919,991 | 4/1990 | Gadkaree | 428/113 |
| 4,961,990 | 9/1990 | Yamada et al. | 428/240 |
| 4,971,779 | 11/1990 | Paine, Jr. et al. | 423/290 |
| 5,023,214 | 6/1991 | Matsumoto et al. | 501/97 |
| 5,049,329 | 9/1991 | Allaire et al. | 264/60 |
| 5,118,560 | 6/1992 | Tredway | 428/288 |

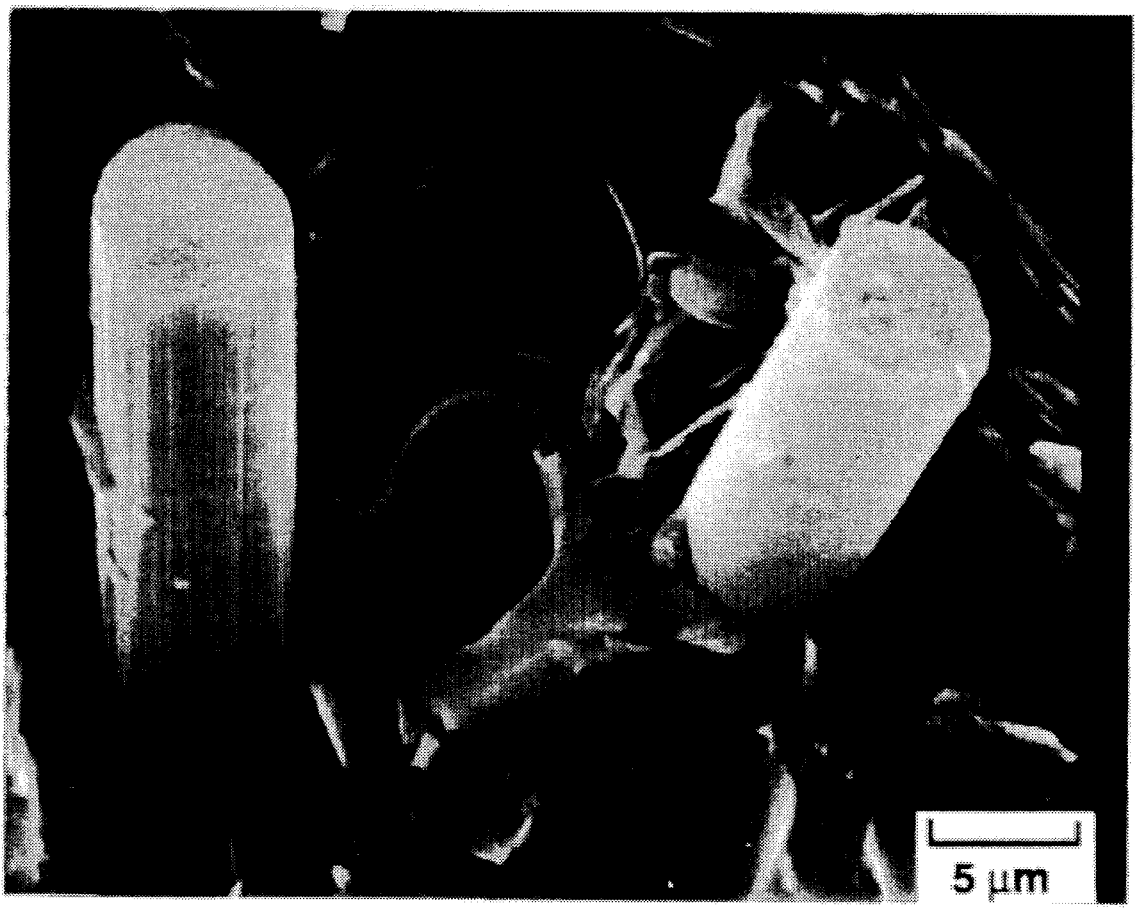

FIBER REINFORCED GLASS MATRIX COMPOSITES WITH SECONDARY MATRIX REINFORCEMENT

TECHNICAL FIELD

This invention relates to fiber reinforced glass matrix composites.

BACKGROUND ART

Fiber reinforced glass matrix composites have, in recent years, come to replace metal in many services requiring high strength, stiffness, and light weight. Among the more common fiber reinforced glass matrix composites are carbon fiber reinforced composites. Such composites can be found in products ranging from sporting goods to jet engines.

Carbon fiber reinforced glass matrix composites (CFRGM composites) typically comprise a glass or glass-ceramic matrix in which carbon fibers are imbedded. The carbon reinforcing fibers may be either continuous or discontinuous depending on the application. Continuous fibers extend for the entire length of a composite article, while discontinuous fibers, which are significantly shorter than continuous fibers, provide more localized matrix reinforcement. As a result, continuous CFRGM composites are often used for load bearing structural applications, while discontinuous CFRGM composites are more suitable for nonload or low load bearing nonstructural applications. Discontinuous CFRGM composites are especially suitable for articles having complex shapes.

The interaction between the carbon fibers and the matrix gives CFRGM composites superior mechanical properties that make them suitable replacements for metals. The fibers contribute to the composite's strength and elastic modulus by absorbing loads transferred from the matrix through fiber-matrix interfacial bonds. The fibers also improve the composite's toughness by inhibiting or blunting the formation of cracks in the matrix. In addition, carbon fibers exposed at the surface of the matrix impart their good lubricating properties to the composite.

Despite their overall superior mechanical properties, CFRGM composites, especially injection molded discontinuous CFRGM composites, can have low Weibull moduli. The Weibull modulus is a statistical measure of the spread in mechanical property data, such as flexural strength data, for many composite samples. A lower Weibull modulus indicates a greater spread in the data. A low Weibull modulus can be undesirable because it can require engineers to apply a large design allowance to articles to ensure reliability. This can require articles to be larger and heavier than if the material had a higher Weibull modulus. As a result, materials with high Weibull moduli are desirable, especially for applications in which size, weight, and reliability are important considerations.

CFRGM composites, like other carbon-containing composites, are susceptible to carbon oxidation. This problem is exacerbated by the presence of matrix microcracks that form during fabrication as a result of a thermal expansion mismatch between the glass matrix and carbon fibers. Microcracking is especially extensive in composites with discontinuous fibers because of the complex stress states arising from the random three-dimensional arrangement of the fibers. Matrix microcracks provide channels that permit oxygen to penetrate the matrix, providing the opportunity for carbon fibers in the interior of the matrix to oxidize when exposed to elevated temperatures. Carbon fiber oxidation can quickly destroy the composite's strength and lubricity, making carbon fiber composites unsuitable for certain applications or requiring frequent replacement of parts constructed from these composites.

Accordingly it would be desirable to have a CFRGM composite that has a high Weibull modulus, improved reliability, resists oxidation, and maintains its strength and lubricity, particularly at high temperatures.

DISCLOSURE OF THE INVENTION

The present invention is directed towards a CFRGM composite that has a high Weibull modulus, improved reliability, resists oxidation, and maintains its strength and lubricity at high temperatures.

One aspect of the invention includes a fiber reinforced glass matrix composite that has a glass or glass-ceramic matrix, a plurality of continuous or discontinuous primary reinforcing fibers dispersed in the matrix, and a plurality of discontinuous secondary reinforcing fibers dispersed in the matrix. The secondary reinforcing fibers which are shorter than the primary fibers fill regions of the matrix not filled with primary reinforcing fibers.

Another aspect of the invention includes a method of making a fiber reinforced glass matrix composite. A plurality of secondary reinforcing fibers are uniformly distributed in a dispersant. A glass powder is mixed in a carrier liquid to create a slurry and the secondary reinforcing fibers and dispersant are slowly added to the slurry so the fibers uniformly disperse as they are added. A binder is also added to the slurry. A continuous fiber is impregnated with the slurry and the impregnated fiber is dried to remove the carrier liquid. The impregnated fiber is cut to a suitable length and molded by a suitable molding method to form a fiber reinforced glass matrix composite.

These and other features and advantages of the present invention will become more apparent from the following description and accompanying FIGURE.

BRIEF DESCRIPTION OF THE DRAWING

The FIGURE is a scanning election micrograph of a composite of the present invention that contains primary and secondary reinforcing fibers and boron nitride secondary reinforcing particles.

BEST MODE FOR CARRYING OUT THE INVENTION

A composite of the present invention has, in the simplest case, a matrix and a plurality of primary and secondary reinforcing fibers dispersed in the matrix. The secondary reinforcing fibers fill matrix-rich areas that would otherwise not be reinforced with primary reinforcing fibers and act as a secondary reinforcing phase.

The matrix may be any glass or glass-ceramic that imparts formability, thermal stability, and abrasion resistance to the composite. Suitable glass materials include borosilicate glass, high silica content glass, aluminosilicate glass, and mixtures thereof. Suitable glass-ceramic materials include lithium aluminosilicate and other conventional glass-ceramics such as aluminosilicate, barium-magnesium aluminosilicate, barium aluminosilicate, magnesium aluminosilicate, calcium aluminosilicate, and combinations thereof.

Borosilicate glass is the preferred matrix material because it is more easily processed than other materials and possesses satisfactory thermal stability. Suitable borosilicate glasses include Corning Code 7070 and Corning Code 7740 (Corning Glass Works, Corning, N.Y.). Corning Code 7070 glass is especially preferred because its lower viscosity characteristics make composite articles easier to manufacture. Corning Code 7070 glass has a tensile modulus of $7.4 \times 10^6$ pounds per square inch (psi), a density of 2.13 grams per cubic centimeter ($g/cm^3$), a coefficient of thermal expansion (CTE) of $32 \times 10^{-7}$ centimeter per centimeter per degree Celsius (cm/cm°C.), an anneal point of 496° C., a softening point of 760° C., and a working point of 1068° C. Corning Code 7740 glass has a tensile modulus of $9.1 \times 10^6$ psi, a density of 2.23 $g/cm^3$, a CTE of $32.5 \times 10^{-7}$ cm/cm°C., and anneal point of 560° C., a softening point of 821° C., and a working point of 1252° C.

Both the primary and secondary reinforcing fibers may be any monofilament fibers or multifilament yarns that are conventionally used to reinforce glass or glass-ceramic matrices. For example, the reinforcing fibers may be carbon, carbide, such as silicon carbide, nitride, such as silicon nitride, or oxide. Suitable fibers based on silicon carbide include the NICALON® family of fibers (Nippon Carbon Ltd., Tokyo, Japan) and the TYRANNO FIBER® family of fibers (Ube Industries Ltd., Ube City, Japan). Suitable fibers based on silicon nitride include HPZ fibers (Dow-Corning, Inc., Midland, Mich.). Preferably, the primary and secondary reinforcing fibers will be carbon fibers, especially carbon fibers that have a tensile strength greater than about $300 \times 10^3$ psi, a tensile modulus greater than about $35 \times 10^6$ psi, and are stable in an inert atmosphere at temperatures up to about 1400° C. While monofilament fibers may be used, multifilament carbon yarns are preferred. A multifilament carbon yarn with an average filament diameter of about 6 microns ($\mu m$) to about 10 $\mu m$, and particularly about 7 $\mu m$ to about 10 $\mu m$ is especially preferred. Suitable carbon yarns include HMU™ (Hercules Corporation, Wilmington, Del.), HM-S (Hysol Grafil Co., Pittsburg, Calif.), P-100 (Amoco Performance Products, Ridgefield, Conn.), and FORCA FT700 (Tonen Corporation, Tokyo, Japan). The HMU™ yarn is available with 1000, 3000, 6000, or 12,000 fibers per tow and an average fiber diameter of 8 $\mu m$. It has a tensile strength of $400 \times 10^3$ psi, a tensile modulus of $55 \times 10^6$ psi, a CTE of $-7 \times 10^{-7}$ cm/cm°C., and a density of 1.84 $g/cm^3$. The HM-S fiber has a diameter of 6.6 $\mu m$ and the same mechanical properties as the HMU™ yarn. The P-100 fiber has a tensile strength of $325 \times 10^3$ psi, a tensile modulus of $105 \times 10^6$ psi, a CTE of $-16 \times 10^{-7}$ cm/cm°C., and a density of 2.16 $g/cm^3$. The FT700 yarn has a tensile strength of $500 \times 10^3$ psi, a tensile modulus of $100 \times 10^6$ psi, a CTE of $-15 \times 10^{-7}$ cm/cm°C., and a density of 2.14 $g/cm^3$. The HMU™ fiber is preferred for discontinuous reinforced composites because of it's inherently higher failure strain.

Depending on the application, the primary reinforcing fibers may be either continuous or discontinuous. If the primary reinforcing fibers are continuous, their length and orientation should be compatible with conventional continuous fiber reinforced glass matrix composite molding techniques. If the primary reinforcing fibers are discontinuous, they may be about 3 mm (0.125 inch) to about 25 mm (1 inch) long. Preferably, discontinuous primary reinforcing fibers will be about 6 mm (0.25 inch) to about 12.7 mm (0.5 inch) long and, most preferably, about 12.7 mm long. The secondary reinforcing fibers should be shorter than the primary fibers, although they should have a diameter of the same order of magnitude as the diameter of the primary fibers. In particular, the secondary reinforcing fibers may be about 0.5 mm (0.02 inch) to about 2 mm (0.08 inch) long. Preferably, the secondary reinforcing fibers will be about 0.8 mm (0.03 inch) to about 1.2 mm (0.05 inch) long. Most preferably, the secondary reinforcing fibers will be about 1 mm (0.04 inch long). The distribution of discontinuous primary and secondary reinforcing fibers in the matrix should be homogeneous and random.

To improve the oxidative stability and lubricity of the composite of the present invention, the composite also may include a plurality of boron nitride (BN) particles dispersed in the matrix as an additional secondary reinforcing phase. The BN reinforcing particles may be any conventional shape, including rods, discs, platelets, or spheres. Discs and platelets are the preferred shapes. Preferably, the particles will have an aspect ratio of at least 5:1 and will be no more than about one-half the diameter of the reinforcing fibers in any direction. Disc-shaped particles, for example platelets, with an aspect ratio of about 5:1 have a normalized toughening increment of 1.25–1.5. The normalized toughening increment is a theoretical parameter in which 1.0 indicates no matrix toughening, while values greater than 1.0 indicate the relative degree of matrix toughening. Higher aspect ratios would provide even greater normalized toughening increments. Most preferably, the BN particles will be no more than about 10% to about 40% of the diameter of the carbon fibers in any direction. Preferably, distribution of the BN particles throughout the matrix will be homogeneous and random. BN platelets with a diameter of about 0.5 $\mu m$ to about 2.0 $\mu m$ diameter and a thickness of about 0.10 $\mu m$ or less are particularly suitable for use in carbon fiber reinforced borosilicate glass composites in which the primary reinforcing fibers have a diameter of about 7 $\mu m$ to about 10 $\mu m$. Suitable BN platelets include hexagonal BN (Cerac, Milwaukee, Wisc.), HCP, HPF, and MW-5 BN (Union Carbide Advanced Ceramics, Cleveland, Ohio), Combat® BN (Standard Oil Engineered Materials, Niagara Falls, N.Y.), and Type S BN (ESK Engineered Ceramics, New Canaan, Conn.).

A composite article of the present invention may be made in any of the ways known to the art for making similar composites that do not contain secondary reinforcing phases. Compression molding and injection molding are the preferred methods. The key difference between the methods known in the art and the methods required to practice the current invention is the addition of a secondary reinforcing phase to the composite.

The secondary reinforcing phases may be incorporated into the composite in several ways. For example, the secondary reinforcing fibers and BN particles may be mechanically mixed with prepregged, chopped primary reinforcing fibers. The preferred method is to incorporate the secondary reinforcing phases directly into the primary fiber tow with the glass powder during the prepregging process. This method uniformly distributes the secondary reinforcing phases between the prepregged primary reinforcing fibers and eliminates any mixing that may segregate the glass from the other constituents.

The secondary reinforcing phases can be incorporated directly into the primary fiber tow with a slurry of glass powder, secondary reinforcing phases, and a carrier liquid. Preferably, the glass powder will be about $-325$ mesh, the secondary reinforcing fibers about 1 mm long, and the BN reinforcing particles, if used, about 1 $\mu m$ in diameter. The preferred carrier is water, although any liquid compatible with the binder to be added later in the process may be used. If secondary reinforcing fibers will be the only secondary phase in the composite, the slurry should have an adequate amount of material to make a prepreg with about 15 volume percent (vol %) to about 40 vol % primary reinforcing fibers, about 1 vol % to about 10 vol % secondary reinforcing fibers, and about 50 vol % to about 84 vol % glass matrix when the carrier liquid and binder are removed. If the composite also will include BN particles, the slurry should have enough material to make a prepreg with about 15 vol % to about 40 vol % primary reinforcing fibers, about 1 vol % to about 10 vol % secondary reinforcing fibers, about 10 vol % to about 30 vol % BN particles, and about 40 vol % to about 74 vol % glass matrix when the carrier liquid and binder are removed. The preferred amounts of glass, fibers, and BN particles depend on the particular application. In a composite containing both secondary reinforcing fibers and BN particles, about 4 vol % secondary reinforcing fibers and about 14 vol % BN particles may be desirable.

To make the slurry, an appropriate amount of glass powder should be added to an appropriate amount of carrier in a suitable container. The container should be shaken vigorously to disperse the glass powder in the carrier. The resulting glass powder/carrier slurry can be placed on a mixer to keep the glass powder dispersed. If the final slurry will contain BN particles, they should be added to the glass powder/carrier slurry at this point. The BN-containing slurry should be shaken vigorously for a few minutes to initially disperse the BN particles and then milled to break up any clumps of BN particles. Preferably, the slurry will be milled with an ultrasonic mixer for about 15 minutes or until any BN clumps are broken up. A Model VT600 Vibra-Cell high intensity ultrasonic processor (Sonics & Materials, Danbury, Conn.) is a suitable ultrasonic mixer. Operating the mill at 70% power and a 50% duty cycle (on-off cycle of 1:1) may be particularly effective.

To make it easier to add the secondary reinforcing fibers to the glass powder/carrier slurry or glass powder/BN particle/carrier slurry, the secondary fibers should first be uniformly distributed in a suitable dispersant to make a dispersion. The dispersant should contain a small amount of a wetting agent. Suitable dispersants include water and alcohols such as methanol, ethanol, propanol, or butanol. The preferred dispersant is 2-propanol. The wetting agent may be any conventional wetting agent that is compatible with the dispersant and improves the dispersant's ability to wet the secondary reinforcing fibers. For example, if the dispersant is 2-propanol, TERGITOL® non-ionic 15-5-9 surfactant (Union Carbide Corporation, Research and Development Department, Tarrytown, N.Y.) may be an appropriate wetting agent. While the specific amounts of dispersant and wetting agent are not critical, enough dispersant should be used to make a fairly dilute dispersion. The amount of wetting agent used should be as low as possible, while still permitting the slurry's carrier to wet the secondary reinforcing fibers. After the dispersion has been made, it can be milled, preferably with an ultrasonic mill, to ensure that the secondary fibers are uniformly distributed. The dispersion should be slowly added to the slurry so the secondary fibers are uniformly distributed in the carrier as they are added and do not clump together. To ensure that the secondary fibers are well dispersed, the slurry can be milled, preferably with an ultrasonic mixer.

After the secondary reinforcing fibers are added to the slurry and all milling is complete, a binder should be added to hold the glass powder and secondary reinforcing phases in place within the fiber tow during later cutting or chopping operations. The binder may be any of the binders customarily used to prepreg carbon fibers. For example, the binder may be a polymeric binder that dissolves or disperses readily in the carrier. Preferred polymeric binders include latex-acrylic type polymers, such as RHOPLEX® latex-acrylic (Rohm & Haas Corporation, Philadelphia, Pa.), and the CARBOWAX® series of polymers (Union Carbide Corporate, Danbury, Conn.), such as CARBOWAX® 4000. Alternately, the binder may be an inorganic binder that dissolves or disperses readily in the carrier. Preferred inorganic binders include colloidal silica solutions, such as LUDOX® (E.I. DuPont de Nemours, Wilmington, Del.).

Once the glass powder/secondary reinforcing phase/carrier/binder slurry has been prepared, fiber tows are drawn through the slurry so the slurry saturates the fiber tow. When the proper proportions of the slurry constituents are used, the fiber tows will be impregnated with an amount of glass sufficient to bring the volume fraction of glass into the desired range. The impregnated tows are then wound onto a mandrel and dried.

The dried tows are cut to a length useful with the intended molding process. For injection molding, for example, the fibers should be cut short enough to prevent clumping when they pass through an orifice into a mold. Preferably, primary fibers used for injection molding will be about 6 mm to about 12.7 mm in length. Finally, the impregnated tows are formed into desired articles by any of the methods known to the art for forming CFRGM composites.

The following examples are given to demonstrate the present invention without limiting the invention's broad scope.

EXAMPLE 1

326 meters of HMU™ MAGNAMITE® graphite fibers (Hercules Incorporated, Wilmington, Del.), weighing 72 grams and having 3000 filaments per tow were impregnated with a glass powder/secondary reinforcing fiber/water/binder slurry. The slurry consisted of 381 grams of −325 mesh Corning Code 7070 borosilicate glass powder (Corning Glass Works, Corning, N.Y.), 16.5 grams of HM-S carbon fibers (Hysol Grafil Co., Pittsburg, Calif.) having an average length of 1 mm, 50 grams of LUDOX® colloidal silica binder (E.I. DuPont de Nemours, Wilmington, Del.), 500 ml of distilled water, 300 ml of 2-propanol, used as a dispersant for the HM-S carbon fibers, and several drops of TERGITOL® wetting agent (Union Carbide Corporation, Research and Development Department, Tarrytown, N.Y.). Before slowly mixing the HM-S carbon fibers into the slurry, the fibers were dispersed in the 2-propanol to which the TERGITOL® was added. After the slurry was prepared, the fiber yarn was unrolled from a feed spool, passed through a bunsen burner flame at about 6.5 meters/min to remove the fiber sizing, immersed in the agitated slurry to saturate the yarn, and wound onto a take-up mandrel. Sufficient slurry impregnated the yarn to add 316 grams of glass powder and 14 grams of HM-S carbon fibers. The saturated yarn was dried on the take-up mandrel to remove the water.

After drying, the impregnated yarn was removed from the take-up mandrel and cut to an average length of 12.7 mm. The chopped prepregged fibers, known as molding compound, were placed in the reservoir chamber of an injection molding apparatus that had an injection port with a width of 5.1 mm and a length of 75 mm. The injection molding apparatus was placed in a vacuum hot press and heated to 1275° C. A load calculated to apply 7 MPa to the plunger was applied and maintained for 30 minutes. Furnace power was shut off and the assembly cooled to 500° C. at which point the pressure was removed. The assembly was cooled to room temperature and the injection molded part was removed from the mold.

EXAMPLE 2

355 meters of HMU™ MAGNAMITE® graphite fibers weighing 76 grams and having 3000 filaments per tow were impregnated with a glass powder/secondary reinforcing fiber/BN particle/water/binder slurry by drawing the fibers through the slurry as in Example 1. The slurry had 300 grams of −325 mesh Corning Code 7070 borosilicate glass powder, 16.5 grams of HM-S carbon fibers having an average length of 1 mm, 80 grams of hexagonal BN platelets (Cerac, Milwaukee, Wisc.), 50 grams of LUDOX® colloidal silica binder, 600 ml of distilled water, 300 ml of 2-propanol, used as a dispersant for the HM-S carbon fibers, and several drops of TERGITOL® wetting agent. Sufficient slurry impregnated the yarn to add 216 grams of glass powder, 12 grams of HM-S carbon fibers, and 58 grams of BN platelets. The saturated yarn was dried on the take-up mandrel to remove the water. After drying, the impregnated yarn was chopped into a molding compound and injection molded as in Example 1. The FIGURE is a scanning electron micrograph of a section of this composite. The smooth fiber is a HMU™ fiber, while the rough fiber is a HM-S fiber. The BN platelets are well distributed in the matrix.

Visual analysis of composites made in these examples showed that the secondary reinforcing phases filled regions of the matrix that were not filled with primary reinforcing fibers. As a result, the composites had very few unreinforced, matrix-rich regions. Later machining of composites of the present invention showed that they were more easily machined because of the presence of the BN platelets, and had less tendency to chip because of the decrease in matrix-rich regions, now filled with secondary fibers.

Test data, presented in the Table, showed that the composites of the present invention had improved mechanical properties compared with a conventional composite. The conventional composite had only a Corning Code 7070 glass matrix and 12.7 mm long carbon fibers.

TABLE

|  | Conventional Composite | Composite + Secondary Fibers | Composite + Secondary Fibers + BN |
| --- | --- | --- | --- |
| Primary Fiber, vol % | 23 | 25 | 24 |
| Secondary Fiber, vol % | 0 | 4 | 4 |
| Boron Nitride, vol % | 0 | 0 | 14 |
| Weibull Modulus | 4.35 | Insufficient Data | 6.52 |
| Flexural Elastic Modulus, $10^6$ psi | 5.0 | 5.9 | 9.5 |
| Flexural Strength, $10^3$ psi | 19 | 24 | 21 |
| Oxidized Flexural Strength, $10^3$ psi | 5 | 16 | 20 |
| Apparent Porosity, % | 0.60 | 0.40 | 0.19 |

These data show that the composites with secondary reinforcing phases had better elastic moduli and flexural strength than the conventional composite. The composite with secondary fibers and BN also had a higher Weibull modulus than the conventional composite, indicating that it is more reliable. Although there was not enough data to calculate a Weibull modulus for the composite with secondary fibers, the low scatter in the available data indicate that it also would have a higher Weibull modulus than the conventional composite. In addition to improving these properties, the secondary reinforcing phases make crack paths through the matrix longer and more tortuous. As a result, the composites with secondary reinforcing phases have improved toughness and work of fracture compared with the conventional composite. The oxidized flexural strength data show that the secondary reinforcing phases also improved the oxidative stability of the composites of the present invention. These data were taken from composites that were held in oxygen at 450° C. for 100 hours. The secondary reinforcing phases improve oxidative stability by decreasing the amount of matrix microcracking. The apparent porosity data show the extent to which the secondary reinforcing phases decreased matrix microcracking. In addition to acting as a secondary reinforcing phase, the BN platelets also reduce the coefficient of friction of composites of the present invention. This improvement is especially important after heat treating when some of the carbon fibers at the composite's surface are oxidized.

EXAMPLE 3

Six compressor inner shrouds for a gas turbine engine were made from composites of the present invention. Three shrouds contained 76.8 vol % borosilicate glass, 19.5 vol % primary discontinuous carbon fibers, and 3.7 vol % secondary carbon fibers. The other three shrouds contained 59.4 vol % borosilicate glass, 22.9 vol % primary discontinuous carbon fibers, 3.6 vol % secondary carbon fibers, and 14.1 vol % BN platelets. These shrouds were tested in an engine for more than 285 hours at temperatures above 315° C. Both shrouds performed acceptably and showed no signs of structural failure at the end of the test. Compared with shrouds made from conventional composites, the shrouds made with composites of the present invention showed improved wear and oxidation resistance. Therefore, shrouds made from composites of the present invention will potentially have longer service lives than shrouds made from conventional composites.

The composites of the present invention provide several benefits over prior art composites. For example, composites of the present invention have improved matrix toughness, strength, stiffness, machinability, reliability, oxidative stability, and lubricity compared with prior art composites. A person skilled in the art would be able to identify many uses of a composite of the present invention.

The invention is not limited to the particular embodiments shown and described herein. Various changes and modifications may be made without departing from the spirit or scope of the claimed invention.

We claim:

1. A fiber reinforced glass matrix composite, comprising a glass or glass-ceramic matrix and a plurality of primary continuous or discontinuous reinforcing fibers dispersed in the matrix, characterized in that:
   the composite further comprises a plurality of discontinuous secondary reinforcing fibers dispersed in the matrix such that the secondary reinforcing fibers fill regions of the matrix not filled with the primary reinforcing fibers, wherein the secondary reinforcing fibers are shorter than the primary fibers, wherein the secondary reinforcing fibers are about 0.5 mm to about 2 mm long.

2. A carbon fiber reinforced glass matrix composite, comprising a borosilicate glass matrix and a plurality of continuous or discontinuous carbon primary reinforcing fibers dispersed in the matrix, characterized in that;

the composite further comprises about 1 vol % to about 10 vol % of discontinuous carbon secondary reinforcing fibers dispersed in the matrix such that the second reinforcing fibers fill regions of the matrix not filled with the primary reinforcing fibers, wherein the secondary reinforcing fibers are about 0.5 mm to about 2 mm long.

3. The composite of claim 2, further comprising about 10 vol % to about 30 vol % of boron nitride reinforcing particles dispersed in the matrix.

4. A fiber reinforced glass matrix composite, comprising a glass or glass-ceramic matrix and a plurality of primary continuous or discontinuous reinforcing fibers dispersed in the matrix, characterized in that:

the composite further comprises a plurality of discontinuous secondary reinforcing fibers dispersed in the matrix such that the secondary reinforcing fibers fill regions of the matrix not filled with the primary reinforcing fibers, wherein the secondary reinforcing fibers are shorter than the primary fibers, wherein the primary reinforcing fibers are discontinuous fibers about 3 mm to about 25 mm long and the secondary reinforcing fibers are about 0.5 mm to about 2 mm long.

5. The composite of claim 2 wherein the primary reinforcing fibers are discontinuous fibers about 3 mm to about 25 mm long.

6. The composite of claim 2 comprising about 15 vol % to about 40 vol % primary reinforcing fibers and about 50 vol % to about 84 vol % glass matrix.

7. The composite of claim 3 comprising about 15 vol % to about 40 vol % primary reinforcing fibers and about 40 vol % to about 74 vol % glass matrix.

* * * * *